Feb. 7, 1961   L. C. RUSSLER ET AL   2,970,665
WHEEL MOUNTING AND DRIVING MEANS
Filed May 16, 1958
2 Sheets-Sheet 1

INVENTORS
LEVERET C. RUSSLER
WALTER J. FRISCH
BRYAN WRIGHT
JOHN O. MARTIN
BY Wheeler, Wheeler & Wheeler
ATTORNEYS Feb. 7, 1961 L. C. RUSSLER ET AL 2,970,665
WHEEL MOUNTING AND DRIVING MEANS
Filed May 16, 1958 2 Sheets-Sheet 2

INVENTORS
LEVERET C. RUSSLER
WALTER J. FRISCH
BRYAN WRIGHT
JOHN D. MARTIN
BY Wheeler, Wheeler + Wheeler
ATTORNEYS

United States Patent Office 2,970,665
Patented Feb. 7, 1961

2,970,665

WHEEL MOUNTING AND DRIVING MEANS

Leveret C. Russler, Bryan Wright, and John D. Martin, Clintonville, Wis., and Walter J. Frisch, Campbell, Calif., assignors to FWD Corporation, a corporation of Wisconsin Filed May 16, 1958, Ser. No. 735,850

10 Claims. (Cl. 180—70)

This application relates to removable wheel mounting and driving means.

The invention consists of means for mounting a wheel between two vertical parts of a vehicle to support both parts from the ends of the wheel, the mounting being accomplished in such a way that the wheel may be removed from the vehicle by means operated entirely from one end of the wheel.

The invention further comprises a means of driving a wheel directly from a true planetary gear set, one end of the wheel supporting said gear set, and thereby supporting the vehicle.

The invention further comprises a wheel having a stub axle portion which is telescopically retractable from a vehicle supporting position by means of connections at the other end of the wheel.

The invention further comprises bearing means for a wheel which are retractable to release said wheel without removing said bearings from the vehicle or exposing them to contamination.

The invention further comprises air supply means for a vehicle tire which cooperates with said retractable bearing means and with said telescopicaly retractable vehicle support means to shield them from contamination and to provide a single station at which a vehicle wheel may be removed from supports at both ends of its axis.

In the drawings:

Figure 3 is a view similar to Figure 2 in which the parts are arranged for removal of the wheel and showing parts of the structure in elevation.

Figure 2:
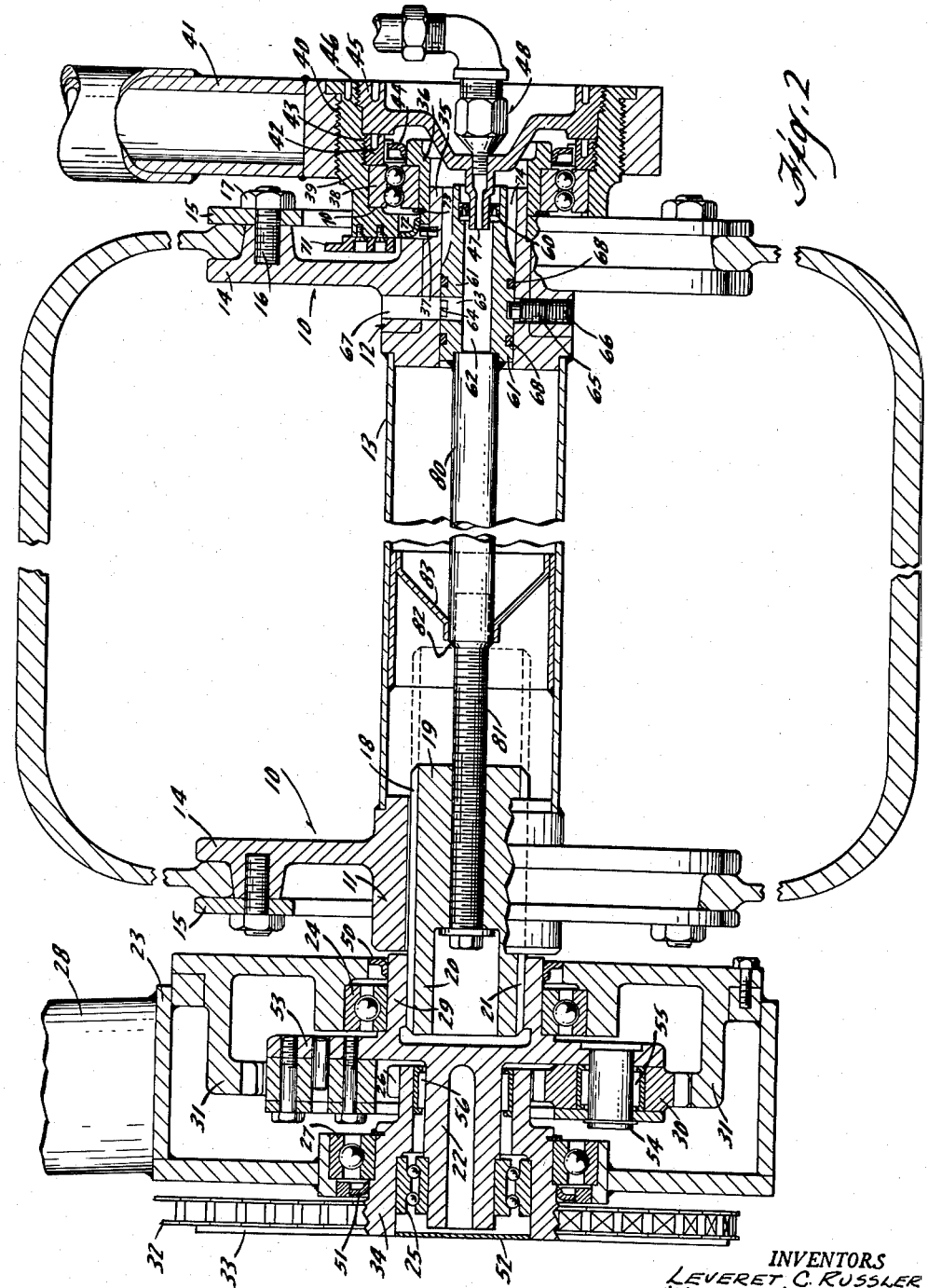
Figure 2 is an axial cross-sectional view through our wheel and gear set.

Referring now to the drawings, Fig. 2 shows a vehicle wheel 10 having a hub portion 11 at one end of the wheel and a hub portion 12 at the other end of the wheel, said hubs being joined by a cylindrical tube 13. Each hub is provided with a radial tire bead clamping flange 14, and with a tire bead clamping ring 15 opposed to said flanges 14 and secured to the hubs by means of conventional studs 16 and nuts 17.

The vehicle is supported at the ends of the wheel axis by supports 28 and 41. Support 28 terminates in a gear box 23 which carries a planetary gear set and one set of wheel bearings 24. Support 41 carries the other set of wheel bearings 38.

Hub 11, at the left side of Fig. 2, is provided with internal splines cooperating with external splines 18 on stub axle 19 so that the stub axle is axially slidable in hub 11. Stud axle 19 is provided with end portion 20 extending beyond hub 11 in its Fig. 2 position for splined engagement at 21 with interiorly splined portion 29 of stub shaft 22, within planetary gear housing 23. Bearing 24 supports the gear housing 23 on portion 29 of stub shaft 22, thereby supporting the vehicle through support 28 secured to gear box 23.

Gear housing 23 houses a planetary gear set consisting of sun gear 26, planetary pinions 30, which are constantly in mesh with sun gear 26, and ring gear 31, which may be integral with a portion of housing 23 and is constantly in mesh with pinions 30. Chain 32 drives sprocket 33, which is nonrotatably secured to sun gear shaft 34. Sun gear shaft 34 bears sun gear 26 at one end thereof, so that when it is rotated it drives pinions 30 with respect to fixed ring gear 31. Pinions 30 drive pinion carrier flange 53 of stub shaft 22 through pinion bearings 55 and pinion shafts 54. As described above, stub shaft 22 terminates at its inner end in an interiorly splined portion 29, which engages exteriorly splined portion 20 of stub axle 19 to drive wheel 10. Thus a true planetary reduction gear is provided directly adjacent the wheel, providing greatly improved torque characterisics in the drive train without sacrificing adequate support between the vehicle and the wheel, or between the elements of the planetary gear set.

As above described, bearing 24 supports the vehicle on portion 29 of stub shaft 22. Stub axle 19 is received within stub shaft portion 29 and within hub 11, which is directly adjacent to stub shaft portion 29, so that the distance between the bearing and the wheel is very slight. The outer end of stub shaft 22 carries bearing 25, which contains elements to resist axial thrust in both directions. Sun gear shaft 34 surrounds bearing 25 and carries bearing 27, whose outer race is held by gear box 23. Directly under sun gear 26 bearing 56 is provided between stub shaft 22 and concentric gear shaft 34. Thus each shaft is supported at each end to minimize strains.

Gear housing 23 is protected by dust shields 50 and 51, and by cover plates 52 on sun gear shaft 34.

Wheel hub portion 12, at the right side of Fig. 2, is provided with end portion 35 which carries annulus 36, which is an annular member slidably received on the hub and prevented from rotation thereon by means of pin 37. Annulus 36 carries wheel bearing 38, which in turn carries annulus 39. Annulus 39 has a screw threaded engagement at 40 with vehicle support 41.

Bearing 38 is held axially by shoulder 70 on annulus 39, and by annulus 42 which has a screw threaded engagement at 43 with the inner periphery of annulus 39, and which carries dust shield 44 bearing on annulus 36. The bearing is further protected by cover plate 45 which has a screw threaded engagement at 46 with the inner periphery of annulus 39, said cover plate being unbroken except for an air supply nozzle 47 co-axial with hub portion 12. A rotary air seal 60 is provided between rotatable member 61, within hub 12, and nozzle 47. Rotatable member 61 is provided with a central passage 62 and a side passage 63 opening from the central passage to annular groove 64 in the periphery of member 61. Member 61 is restrained from axial movement by set screw 65 in hub 12, which enters annular groove 64. Set screw 65 is locked by screw 66. Passage 67 is provided in hub 12 in alignment with groove 64 to permit air from nozzle 47 to enter the space enclosed by the wheel and the tire. O-rings 68 between member 61 and hub 12 prevent the escape of air axially from groove 64. Thus the air pressure within the tire may be maintained or changed while the vehicle is in operation, by altering the air pressure in supply nozzle 47 by conventional means.

The wheel may be removed from between supports 28 and 41 by first removing air fitting 48 from cover plate 45. Cover plate 45 is then unscrewed from annulus 39, giving access to splines 74 at the outer end of member 61. A special tool is engaged with splines 74 and member 61 is rotated thereby, being held in position axially by the engagement of set screw 65 with slot 64. Shaft 80 is firmly secured to member 61 and is provided with a threaded end portion 81, to the left of shoulder 82 in Fig. 2. The left end of shaft 80 is rotatably supported in the wheel 10 by conical member 83 which is secured to tubular portion 13 of the wheel. Screw threads 81 are in threaded engagement with stub axle 19, so that upon rotation of member 61 stub axle 19 is retracted from its splined engagement with portion 29 of stub shaft 22 in gear box 23, until axle 19 lies wholly outside of gear box 23, at which time its axial movement is arrested by shoulder 82 on shaft 80, as shown in Fig. 3.

Annulus 39 is then unscrewed from vehicle support 41 until stop blocks 71, secured to the rear margin of annulus 39, engage the vehicle support to prevent complete removal of the bearings from the vehicle support during the removal of the wheel. Its dimensions are such, however, as to permit annulus 39 and all of the structure between annulus 39 and annulus 36 to be retracted sufficiently to clear projecting portion 35 of hub 12, as shown in Fig. 3. It will be noted that dust seals 44 and 72 are not disturbed during this operation, so that the bearing is protected at all times. The only part which is completely removed is cover 45, which is large and not likely to be lost.

If it is desired to remove the bearing after the wheel is removed, it is only necessary to unscrew annulus 42 from annulus 39, which completely frees the bearing for removal with annulus 36. Snap ring 73 is then removed to allow removal of the bearing from annulus 36.

With axle 19 free of gear box 23, and with annulus 39 and associated parts clear of hub end 35, the wheel may be rolled away. It will be further noted that removal of the air fittings permits deflation of the tire, so that the wheel tends to drop away from the normal position when the hubs are freed from the vehicle supports, which further aids in removal of the wheel.

Figure 1:
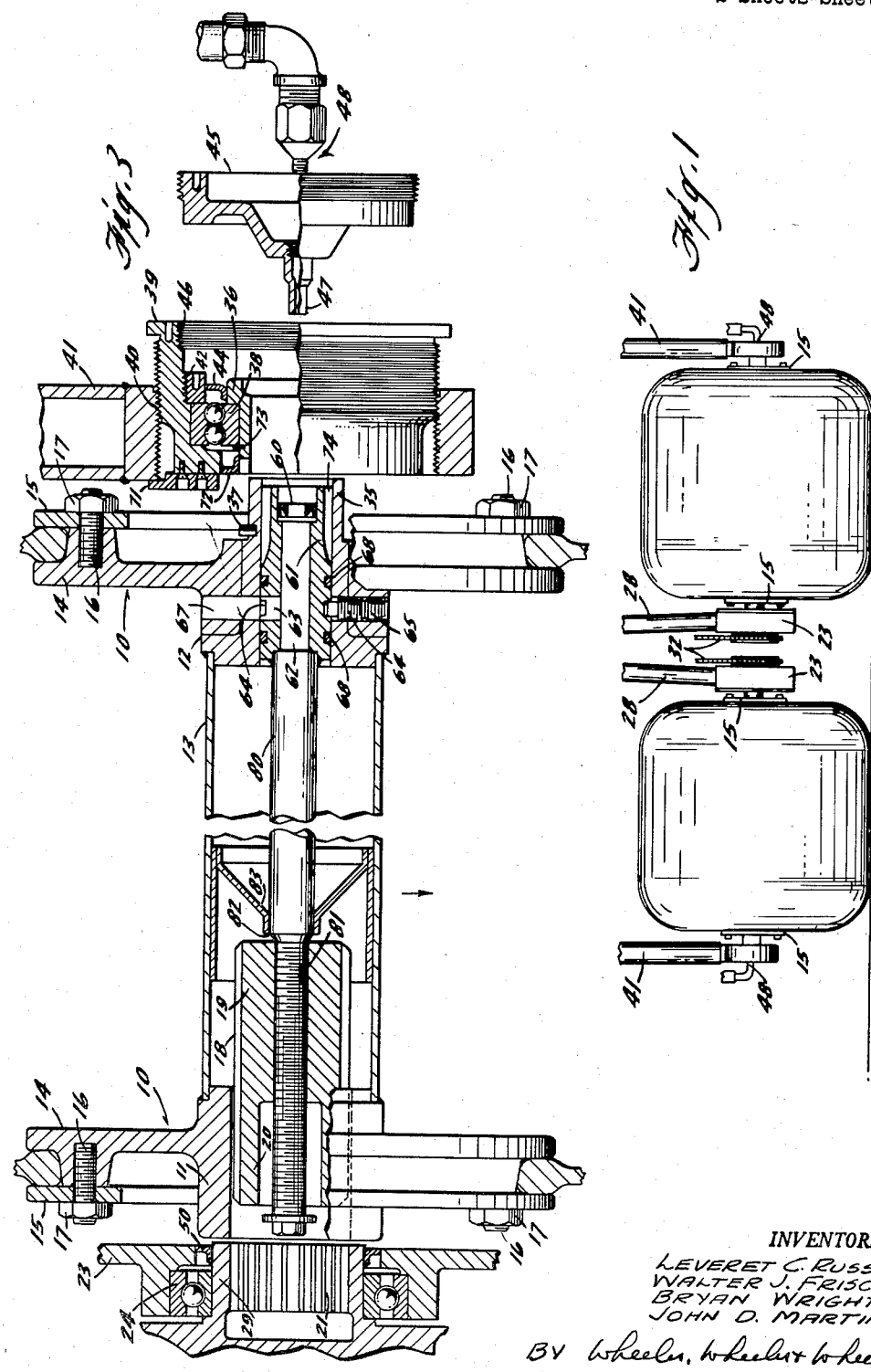
Figure 1 is a front plan view showing two adjacent vehicle wheels mounted according to our invention.

Thus all operations necessary for removal of the wheel may be performed from the right side of the wheel, as viewed in Fig. 2, a feature which becomes important when the wheels are mounted as shown in Fig. 1 with each gear box 23 closely adjacent to the corresponding gear box for another wheel, so as to block access.

We claim:
1. A vehicle comprising a wheel having an axis of rotation, first and second vehicle supports at opposite ends of said axis, first means for disengaging said wheel from said first support, and concentric second means operated from the first of said supports to disengage the wheel from the second of said supports, said second means including a part disposed adjacent the first support, said second means further including a member on said wheel mounted for axial movement with respect to the wheel between a position in which it carries said second support, and a position in which it is disengaged from said second support, the said part of said means for disengaging the wheel comprising a rotatably mounted axially fixed threaded shaft extending axially through said wheel, and mating threads on said axially movable member engaged with said threaded shaft whereby rotation of said shaft will move said member axially from one said position to the other.

2. The device of claim 1 in which said second support member comprises a planetary gear set, said axially movable member being in driven engagement with said gear set and in driving engagement with said wheel.

3. A vehicle comprising a wheel having an axis of rotation, first and second vehicle supports at opposite ends of said axis, first means for disengaging said wheel from said first support, and concentric second means operated from the first of said supports to disengage the wheel from the second of said supports, said second means including a part disposed adjacent the first support, said first support member including a wheel bearing, a series of nested annuli, enclosing said wheel bearing, said annuli being retractably mounted in said first support member to withdraw said bearing from said wheel, said nested annuli being adapted to completely enclose said bearing for protection while said bearing is retracted from engagement with said wheel.

4. The device of claim 3 further comprising a pneumatic tire on said wheel, a part of said wheel being in airtight communication with said pneumatic tire, said nested annuli being provided with an air supply fitting in rotatable engagement with said part in communication with said tire whereby to inflate the tire during operation of the vehicle.

5. The device of claim 4 in which a single part comprises said part in communication with said tire and said part disposed adjacent the first support.

6. A vehicle comprising a wheel, a vehicle support adjacent each side of said wheel, a bearing between the first said vehicle support and said wheel, said bearing being secured in said first vehicle support for movement between a wheel engaging position and a retracted position for removal of said wheel from the vehicle, a retractable member detachably connecting said second support member and said wheel, and means operable from said first support member to retract said retractable member, said bearing being secured in said first wheel support by means of a series of nested annuli, at least one of said annuli being rotationally stationary with respect to the said first vehicle support, and at least one other of said annuli being rotationally stationary with respect to the wheel during vehicle operation.

7. The device of claim 6, further comprising stop means defining the retracted position of said bearing.

8. A vehicle comprising a wheel, a vehicle support adjacent each side of said wheel, a bearing between the first said vehicle support and said wheel, said bearing being secured in said first vehicle support for movement between a wheel engaging position and a retracted position for removal of said wheel from the vehicle, a retractable member detachably connecting said second support member and said wheel, and means operable from said first support member to retract said retractable member, said retractable member comprising a stub axle axially movable from a position wholly within said wheel to a position partly within said wheel and partly within said second vehicle support.

9. The device of claim 8 in which said stub axle is non-rotatably engaged with said wheel and with a driving member which comprises part of said second vehicle support.

10. A vehicle comprising a wheel, a vehicle support adjacent each side of said wheel, a bearing between the first said vehicle support and said wheel, said bearing being secured in said first vehicle support for movement between a wheel engaging position and a retracted position for removal of said wheel from the vehicle, a retractable member detachably connecting said second support member and said wheel, and means operable from said first support member to retract said retractable member, said wheel being provided with a pneumatic tire, said means operable from said first support further comprising means for supplying air to the interior of said tire.

References Cited in the file of this patent
UNITED STATES PATENTS

| | | |
|---|---|---|
| 1,797,713 | Brogelli | Mar. 24, 1931 |
| 1,936,606 | Nicholson | Nov. 28, 1933 |
| 2,404,269 | Bennett | July 16, 1946 |
| 2,548,190 | Arpin | Apr. 10, 1951 |
| 2,557,331 | Wintercorn | June 19, 1951 |
| 2,751,255 | Schroeder | June 19, 1956 |